(12) United States Patent
Pursifull et al.

(10) Patent No.: US 8,230,826 B2
(45) Date of Patent: Jul. 31, 2012

(54) SELECTIVELY STORING REFORMATE

(75) Inventors: Ross Dykstra Pursifull, Dearborn, MI (US); Gopichandra Surnilla, West Bloomfield, MI (US); James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 12/756,853

(22) Filed: Apr. 8, 2010

(65) Prior Publication Data
US 2011/0132289 A1 Jun. 9, 2011

(51) Int. Cl.
*F02B 43/08* (2006.01)
(52) U.S. Cl. ............................. 123/3; 123/2
(58) Field of Classification Search .................. 123/3, 2, 123/1 A
See application file for complete search history.

(56) References Cited

U.S. PATENT DOCUMENTS

| | | | |
|---|---|---|---|
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |
| 6,058,906 A | 5/2000 | Yoshino | |
| 6,088,647 A | 7/2000 | Hemberger et al. | |
| 6,155,212 A * | 12/2000 | McAlister | 123/3 |
| 6,176,215 B1 | 1/2001 | Baur et al. | |
| 6,213,104 B1 | 4/2001 | Ishikirlyama et al. | |
| 6,247,449 B1 | 6/2001 | Persson | |
| 6,272,849 B1 * | 8/2001 | Zanini-Fisher et al. | 60/275 |
| 6,318,306 B1 | 11/2001 | Komatsu | |
| 6,334,424 B1 | 1/2002 | Ito | |
| 6,349,702 B1 | 2/2002 | Nishiyama | |
| 6,390,030 B1 | 5/2002 | Isogawa et al. | |
| 6,463,889 B2 * | 10/2002 | Reddy | 123/3 |
| 6,591,817 B2 | 7/2003 | Deutsch | |

(Continued)

FOREIGN PATENT DOCUMENTS
EP   2 048 339 A1   4/2009

OTHER PUBLICATIONS

Leone, Thomas G., et al., "Method for Operating a Charge Diluted Engine" U.S. Appl. No. 12/756,822, filed Apr. 8, 2010, 87 Pgs.

(Continued)

*Primary Examiner* — Noah Kamen
*Assistant Examiner* — Long T Tran
(74) *Attorney, Agent, or Firm* — Allan J. Lippa; Alleman Hall McCoy Russell & Tuttle LLP (57) ABSTRACT

Systems and methods are provided for selectively storing gaseous reformate output by a fuel reformer for fueling an engine. Carbon monoxide produced by a fuel reformer may be continuously combusted in the engine and/or engine exhaust rather than being stored. In one example, reformate components produced by a fuel reformer, e.g., H2 and CH4, may be stored and buffered for use by an engine.

17 Claims, 4 Drawing Sheets

U.S. PATENT DOCUMENTS

| | | | |
|---|---|---|---|
| 6,705,295 | B1 | 3/2004 | Tarroux et al. |
| 6,711,893 | B2 | 3/2004 | Ueda et al. |
| 6,729,301 | B2 | 5/2004 | Nakamori et al. |
| 6,751,543 | B2 | 6/2004 | Gras et al. |
| 6,851,398 | B2 | 2/2005 | Taylor III et al. |
| 6,964,261 | B2 | 11/2005 | Warne et al. |
| 6,988,481 | B2 | 1/2006 | Sen et al. |
| 6,990,956 | B2 | 1/2006 | Niimi |
| 6,997,142 | B2 | 2/2006 | Wakao et al. |
| 7,047,940 | B2 | 5/2006 | Niimi |
| 7,089,888 | B2 | 8/2006 | Mirji |
| 7,104,244 | B2 | 9/2006 | Nishi et al. |
| 7,159,541 | B2 | 1/2007 | Wakao et al. |
| 7,203,579 | B2 | 4/2007 | Yokota et al. |
| 7,228,841 | B2 | 6/2007 | Takemoto et al. |
| 7,261,065 | B2 | 8/2007 | Aimoto et al. |
| 7,290,522 | B2 * | 11/2007 | Heywood et al. ............. 123/300 |
| 7,370,609 | B2 | 5/2008 | Kamio |
| 7,454,898 | B2 | 11/2008 | Allgeier et al. |
| 7,523,744 | B2 | 4/2009 | Ayame |
| 7,530,335 | B2 | 5/2009 | Sakurai et al. |
| 7,597,068 | B2 * | 10/2009 | Arai et al. ......................... 123/3 |
| 2001/0003977 | A1 | 6/2001 | Hayashi et al. |
| 2002/0004152 | A1 * | 1/2002 | Clawson et al. ................ 429/17 |
| 2003/0211021 | A1 * | 11/2003 | Oi et al. ....................... 422/198 |
| 2004/0050035 | A1 * | 3/2004 | Smaling .......................... 60/285 |
| 2004/0139944 | A1 | 7/2004 | Nakano et al. |
| 2008/0010993 | A1 | 1/2008 | Morgenstern |
| 2008/0098985 | A1 | 5/2008 | Kamio |
| 2008/0141984 | A1 | 6/2008 | Haga |
| 2008/0221778 | A1 | 9/2008 | Kakuho et al. |
| 2008/0228375 | A1 | 9/2008 | Ashida et al. |
| 2008/0282998 | A1 | 11/2008 | Kuzuoka et al. |
| 2009/0017987 | A1 | 1/2009 | Saton et al. |
| 2009/0030588 | A1 | 1/2009 | Yamashita |
| 2009/0043479 | A1 | 2/2009 | Noda et al. |
| 2009/0065409 | A1 | 3/2009 | Kamio et al. |
| 2009/0071453 | A1 | 3/2009 | Stockhausen et al. |

OTHER PUBLICATIONS

Leone, Thomas G., et al. "Method for Operating and Engine with Variable Charge Density" U.S. Appl. No. 12/756,800, filed Apr. 8, 2010, 87 Pgs.

Leone, Thomas G., et al., "Pump Control for Reformate Fuel Storage Tank" U.S. Appl. No. 12/756,827, filed Apr. 8, 2010, 24 Pgs.

Czekala, Michael D., et al., "Ignition Control for Reformate Engine" U.S. Appl. No. 12/756,792, filed Apr. 8, 2010, 32 Pgs.

Pursifull, Ross D., "Fuel Injector Diagnostic for Dual Fuel Engine" U.S. Appl. No. 12/756,838, filed Apr. 8, 2010, 35 Pgs.

Pursifull, Ross D., "Engine Fuel Reformer Monitoring" U.S. Appl. No. 12/756,845, filed Apr. 8, 2010, 37 Pgs.

Gopichandra, Surnilla, et al., "Method for Improving Transient Engine Operation" U.S. Appl. No. 12/756,784, filed Apr. 8, 2010, 77 Pgs.

Leone, Thomas G., "Operating and Engine with Reformate" U.S. Appl. No. 12/756,883, filed Apr. 8, 2010, 48 Pgs.

Leone, Thomas G., et al., "Method for Operating a Vehicle with a Fuel Reformer" U.S. Appl. No. 12/756,892, filed Apr. 8, 2010, 86 Pgs.

Pursifull, Ross D., "Method for Operating an Engine" U.S. Appl. No. 12/756,809, filed Apr. 8, 2010, 87 Pgs.

Leone, Thomas G., "Reformate Control Via Accelerometer" U.S. Appl. No. 12/756,897, filed Apr. 8, 2010, 33 Pgs.

Kerns, James, et al., "Method for Operating an Engine with a Fuel Reformer" U.S. Appl. No. 12/756,858, filed Apr. 8, 2010, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation", pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

SELECTIVELY STORING REFORMATE

FIELD

The present description relates to systems and methods for operating an engine with a fuel reformer.

BACKGROUND AND SUMMARY

Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine. The fuel reformer reaction may be driven by recovered exhaust heat from the engine and gaseous reformate output by the reformer may be stored, e.g., as a compressed or adsorbed gas, for use by the engine.

The inventors herein have recognized that since reformate output by a fuel reformer may include CO, storage of reformate may be degraded due to the presence of CO with the remaining gasses.

In one example approach, in order to at least partially address the above issues, a method for operating an engine is provided. The method comprises: reforming a fuel into a gaseous fuel comprising $H_2$, CO, and $CH_4$; and selectively storing at least one or both of $H_2$ and $CH_4$. For example, CO produced by the reformer may be combusted in the engine and/or engine exhaust rather than being stored.

In this way, reformate components produced by a fuel reformer, e.g., $H_2$ and $CH_4$, may be stored and buffered for use by an engine. Such buffering enables more or less of the $H_2$ and $CH_4$ to be delivered to the engine commensurate with operating conditions, without also requiring storage of CO with the $H_2$ and $CH_4$. Rather, the CO may be delivered to the engine without buffering, as its effect in controlling engine operation, such as knock mitigation, etc., is less than that of the remaining reformate gases ($H_2$ and $CH_4$).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
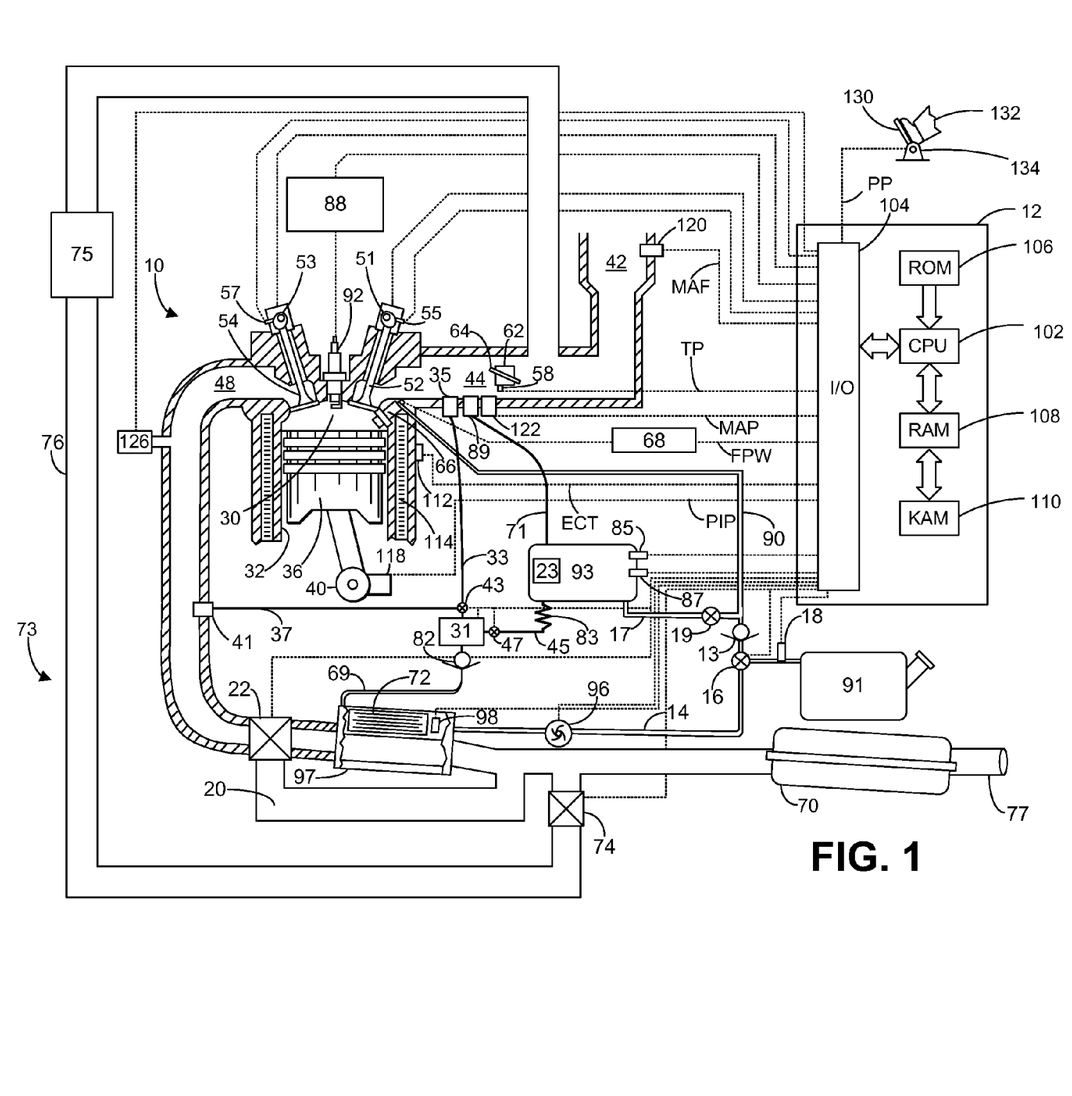
FIG. 1 shows a schematic diagram of an engine with a fuel reformer.

The following description relates to systems and methods for operating an engine with a fuel reformer, a schematic example of which is shown in FIG. 1. Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine. Use of gaseous reformate in an engine may assist in highly dilute operation, engine cold starts and engine knock reduction, e.g., during high load engine operating conditions.

The fuel reformer reaction may be driven by recovered exhaust heat from the engine and gaseous reformate output by the reformer may be stored, e.g., as a compressed or adsorbed gas, for use by the engine.

Figure 2:
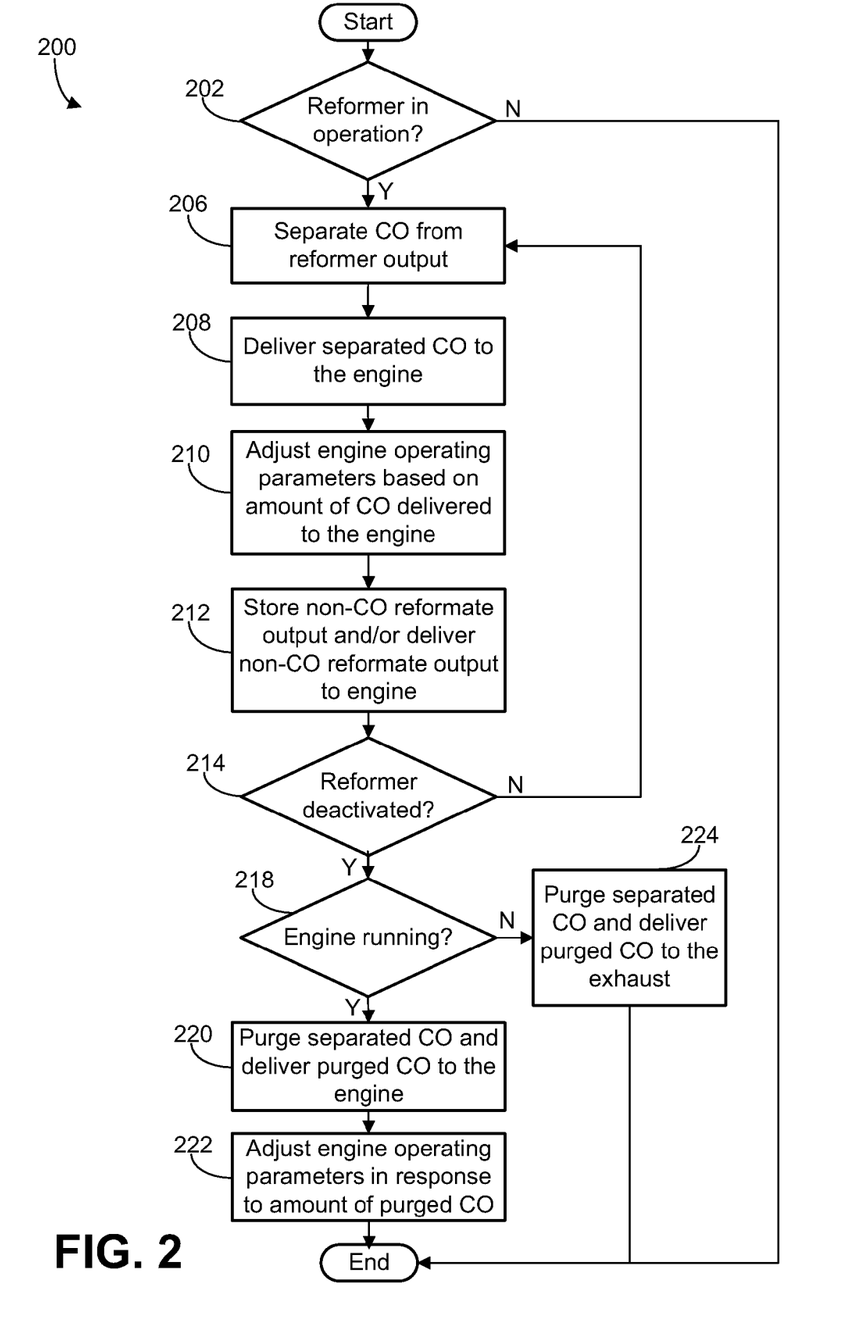
FIG. 2 shows an example method for selectively storing gaseous reformate output by a fuel reformer.

When a fuel is reformed into a gaseous fuel, the gaseous fuel may be selectively stored onboard the engine or delivered to the engine to assist in cold starts and/or knock suppression, for example as shown in FIG. 2. For example, CO may be separated from the gaseous fuel and continuously combusted in the engine or exhaust. In this way, reformate components produced by a fuel reformer, e.g., $H_2$ and $CH_4$, may be safely stored for use by an engine.

Turning now to FIG. 1, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP from a throttle position sensor 58. Intake passage 42 may include a mass air flow sensor 120 and a manifold air pressure sensor 122 for providing respective signals MAF and MAP to controller 12.

A fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. In some embodiments, combustion chamber 30 may alternatively or additionally include a fuel injector arranged in intake passage 44 in a configuration that provides what is known as port injection of fuel into the intake port upstream of combustion chamber 30. Fuel may be delivered to fuel injector 66 by a fuel system including a fuel tank 91, a fuel pump within fuel tank 91 (not shown), a fuel line 90, and a fuel rail (not shown).

In some examples, a plurality of fuel tanks may be employed. For example, the plurality of fuel tanks may include an ethanol fuel tank and a gasoline fuel tank. Each of the plurality of fuel tanks may include a fuel pump and various other components used to assist in delivery of fuel to the engine.

A fuel reformer 97 is shown coupled to exhaust passage 48. Fuel reformer 97 is configured to reform fuel supplied by fuel tank 91 via fuel line 14 into a gaseous fuel reformate. For example, when a fuel in fuel tank 91 includes ethanol, fuel reformer 97 may be configured to reform the fuel into a gaseous fuel reformate comprising $H_2$, CO, and $CH_4$.

A valve 16 may be positioned in fuel line 14 to divert fuel delivery either to the reformer or to the engine. Additionally a fuel sensor 18 may be disposed in the fuel line to determine the type of fuel used, e.g. following a refueling event. In some examples, a fuel evaporator may be employed to vaporize the fuel supplied to the fuel reformer. Thus, for example, a fuel evaporator of vaporizer chamber may be disposed in fuel line 14 or within the same unit as the fuel reformer. Fuel may be injected to the reformer by way of a pump 96 disposed in fuel line 14. In some examples, high pressures may be generated in the gases passing through the reformer. Thus in some examples, pump 96 may include a hydraulic pressure multiplier to assist in delivery of fuel to the reformer at high pressures. As another example, fuel may be injected into the reformer during low pressure conditions. For example, fuel may be injected into the reformer when the amount of gaseous fuel output by the reformer is below a threshold value.

Fuel reformer 97 includes a catalyst 72. In some examples, catalyst 72 may include copper at a surface of a thermally conductive metal supporting structure, e.g., copper-plated Raney nickel. For example, a catalyst may be prepared by depositing copper onto a nickel sponge supporting structure with high surface area.

Reformer 97 may use exhaust heat to drive an endothermic dehydrogenation of ethanol as it passes through the catalyst to promote reformation of ethanol into a gaseous reformate fuel comprising $H_2$, CO, and $CH_4$. For example, vaporized ethanol may pass over the catalyst surface while at an elevated temperature. Thus reformer 97 may be thermally coupled to exhaust passage 48. For example, catalyst 72 of reformer 97 may be thermally coupled to a portion of exhaust conduit 48. For example, gaseous reformate from ethanol may increase a fuel value of ethanol when driven by a free source of heat, e.g., exhaust heat. Additionally, gaseous fuels may displace air in the intake manifold and thus lower pumping work.

In some examples, fuel reformer 97 may include an electric heater 98 for additional temperature control of the fuel reformer. Also, in some examples, a reformer bypass conduit 20 may be disposed in the exhaust conduit in order to direct exhaust gas away from the reformer, e.g., to control the temperature of the fuel reformer. Reformer bypass conduit 20 may include a bypass valve 22 upstream of reformer 97 to control the amount of exhaust gas in thermal contact with reformer 97.

A CO trap 31 may be disposed in a reformer output fuel line 69 to separate CO from gaseous fuel produced by reformer 97. In some examples, CO trap may employ a molecular sieve to separate CO from the reformate gas output by the reformer. For example, a molecular sieve in CO trap 31 may include aluminosilicate minerals, zeolites, or synthetic compounds that have open structures through which $CH_4$ and $H_2$ can diffuse.

In some examples, CO trap 31 may employ pressure swing adsorption to separate CO from the reformer output. In pressure swing adsorption a plurality of adsorbent vessels may be included in CO trap 31. In this way near-continuous separation of CO from the reformate output may be achieved.

CO separated from the reformer output by CO trap 31 may be delivered to an engine inlet and/or exhaust. Since CO is a fuel (e.g., a reductant), CO may at least partially assist in driving the engine through combustion. Separated CO may be delivered to the engine via a CO fuel line 33 and CO injector 35 disposed in intake manifold 44. In some examples, separated CO may be injected directly to cylinder 30. Separated CO may be delivered to the engine exhaust via CO fuel line 37 and CO injector 41 coupled to exhaust passage 48. Separated CO may be directed to the engine and/or exhaust via a valve 43 disposed in a CO outlet in CO trap 31. For example, separated CO output by CO trap 31 may be delivered to one or both of the engine and exhaust.

In some examples, valve 43 may be used during conditions when CO is purged from CO trap 31. For example, if CO trap 31 includes a molecular sieve, then CO may be cyclically purged from the CO trap.

Non-CO gaseous components output by the reformer may be directed to a reformate storage tank 93 via gaseous fuel line 45. Fuel line 45 may include a valve 47 disposed therein to control delivery of gaseous reformate to reformate storage tank 93. In some examples, reformate storage tank 93 may include an onboard CNG compressor 23 which may be used to compress and store at least a portion of non-CO gaseous components.

Gaseous fuel produced by the reformer may be injected to intake manifold 44 by way of a gaseous fuel injector 89. In other examples, gaseous fuel may be directly injected into cylinder 30. Gaseous fuel may be supplied to gaseous fuel injector 89 from a reformate storage tank 93. In some examples, the pressure of the gaseous fuel output by the reformer may be sufficient to assist in delivery of gaseous fuel to the reformate storage tank 93, e.g., due to high temperatures in the reformer. However, in some examples a pump may be disposed in a reformate fuel line 69 to assist in pressurizing gaseous fuel output by the reformer. A check valve 82 disposed in reformate fuel line 69 limits flow of gaseous fuel from storage tank 93 to fuel reformer 97 when the gaseous reformate output by the reformer is at a lower pressure than storage tank 93. In some examples, instead of or in addition to the reformate storage tank, gaseous fuel may be supplied to a fuel cell, e.g., in HEV vehicles.

If fuel reformer 97 is supplied with a blend of fuel including alcohol, a portion of the fuel that is not alcohol may not be reformed, thus may condense. Thus, a heat exchanger 83 may be positioned in the reformate fuel line upstream of reformate storage tank 93 to assist in cooling of the gaseous reformate output by the reformer before it reaches the gaseous fuel injection system. In this way, condensate may be captured in the reformate storage tank before reaching the gaseous fuel injection system.

The reformate storage tank 93 may include a drain line 17 coupled to fuel line 90 to direct condensate from the reformate storage tank 93 to the liquid injection line, e.g., fuel supply line 90. As such a check valve 13 may be positioned upstream of the intersection of the drain line 17 and fuel line 90 so as to prevent condensate from flowing back to the fuel tank. In some examples, condensate from the reformate storage tank 93 may be returned to the fuel tank 91. Additionally, a condensate metering valve 19 may be disposed in drain line 17 to control an amount of condensate delivered to the liquid injection line or returned to fuel tank 91.

A fuel reformer system may include system components used by fuel reformer 97 for operation. For example, a fuel reformer system may include fuel reformer 97, catalyst 72, fuel line 14, electric heater 98, a reformate fuel lines 69 and 71, reformate pump 96, reformate storage tank 93, drain line 17, and various sensors and other components coupled thereto.

In some examples, the fuel reformer system may include a water-gas shift catalyst to convert CO output by the reformer into $CO_2$ and $H_2$. For example, catalyst 72 may assist in a water-gas shift reaction to convert CO into $CO_2$ and $H_2$. In another example, a water-gas shift catalyst may be disposed in reformate fuel line 69 in order to assist in a water-gas shift reaction. Examples of catalysts used to promote a water-gas shift reaction include $Fe_3O_4$ (magnetite), or other transition metals and transition metal oxides, and a Raney copper catalyst. In this way, CO output by the reformer reaction may substantially be converted to $CO_2$ and $H_2$.

Combustion chamber 30 or one or more other combustion chambers of engine 10 may be operated in a compression ignition mode, with or without an ignition spark. Distributorless ignition system 88 provides an ignition spark to combustion chamber 30 via spark plug 92 in response to controller 12.

An exhaust gas sensor 126 is shown coupled to exhaust passage 48 upstream of reformer 97. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

An exhaust gas recirculation system (EGR) 73 may be coupled to exhaust passage 48 downstream of reformer 97. The EGR system may include an EGR valve 74 and an EGR cooler 75 disposed along the EGR conduit 76. Fuel reformer 97 may assist in cooling exhaust gas recirculated to the engine via EGR system 73.

An emission control device 70 is coupled to the exhaust passage downstream of reformer 97. In some examples, emission control device 70 may be located upstream of reformer 97. Emission control device 70 can include multiple catalyst bricks, in one example. In another example, multiple emission control devices, each with multiple bricks, can be used. In some examples, emission control device 70 may be a three-way type catalyst. In other examples, example emission control device 70 may include one or a plurality of a diesel oxidation catalyst (DOC), selective catalytic reduction catalyst (SCR), and a diesel particulate filter (DPF). After passing through emission control device 70, exhaust gas is directed to a tailpipe 77.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of fuel reformer tank pressure from pressure sensor 85; a measurement of fuel reformer tank temperature from temperature sensor 87; a measurement of air mass entering the engine from sensor 120; and a measurement of throttle position from sensor 58. Barometric pressure may also be sensed (sensor not shown) for processing by controller 12. In some examples, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof.

Though FIG. 1 shows only one cylinder of a multi-cylinder engine, each cylinder may similarly include its own set of intake/exhaust valves, fuel injector, spark plug, etc. Additionally, though FIG. 1 shows a normally aspirated engine, engine 10 may be turbocharged in some examples.

Turning now to FIG. 2, an example method 200 for selectively storing reformate output by a fuel reformer is shown.

At 202, method 200 includes determining whether a fuel reformer is in operation. For example, a fuel including an amount of alcohol, e.g., ethanol, may be injected into the reformer. The reformer may reform the fuel into a gaseous reformate. For example, an ethanol reformer may reform ethanol into a reformate gas comprising $H_2$, CO, and $CH_4$. Use of gaseous reformate in an engine may assist in engine cold starts and engine knock reduction, e.g., during high load engine operating conditions.

As described above, in some examples, the fuel reformer system may include a water-gas shift catalyst to convert CO output by the reformer into $CO_2$ and $H_2$. For example, the catalyst in the fuel reformer, e.g., catalyst 72, may assist in a water-gas shift reaction to convert CO into $CO_2$ and $H_2$. In other examples, a water-gas shift catalyst may be disposed in a reformate fuel line, e.g., fuel line 69, in order to assist in a water-gas shift reaction. In this way, CO output by the reformer reaction may substantially be converted to $CO_2$ and $H_2$. However, even if a water gas shift catalyst is employed, CO may still be in the reformer output.

Thus, reformate output by the reformer may be directed through a CO trap disposed in a reformate fuel line, e.g., CO trap 31. The CO trap may separate CO from other components in the reformate gas output by the reformer.

If the reformer is in operation at 202, method 200 proceeds to 206. At 206, method 200 includes separating CO from the reformer output. CO may be separated from the reformer output by a variety of methods and system components.

In some examples, the CO trap may include one or more molecular sieves to separate CO as reformate gas passes through the sieves. For example, a molecular sieve in the CO trap may include aluminosilicate minerals, zeolites, or synthetic compounds that have open structures through which $CH_4$ and $H_2$ can substantially diffuse but through which CO will not substantially diffuse. Operation of a molecular sieve may depend on pressure and/or temperature of the CO trap. For example, an amount of CO separated by a molecular sieve may increase as a pressure of the CO trap increases. Likewise, an amount of CO separated by a molecular sieve may increase as a temperature of the CO trap decreases.

In some examples, the CO trap may employ pressure swing adsorption to separate CO from the reformer output. In pressure swing adsorption a plurality of adsorbent vessels may be included in the CO trap. The adsorbent vessels may include adsorbent materials, e.g., aluminosilicate minerals and/or zeolites. By cycling pressure and/or temperature of the adsorbent vessels in the CO trap, near-continuous separation of CO from the reformate output may be achieved.

However, a delay may occur in output of CO by the CO trap, where the delay may be a duration in which a first adsorbent vessel in a CO trap becomes saturated with CO, e.g., when pressure swing adsorption is employed. When pressure swing adsorption is employed, once the initial delay has passed, then near continuous output of CO by the CO trap may be achieved.

Before passing through the molecular sieve, reformate output by the reformer may comprise CO and non-CO gaseous components, e.g., $H_2$ and $CH_4$. The non-CO components may substantially diffuse through the sieve material whereas CO may not substantially diffuse through the sieve material. Thus, in some examples, when a molecular sieve is employed in the CO trap, CO may be output by the CO trap during conditions when reformate gas is not injected into the CO trap.

For example the pressure and/or temperature of the CO trap may increase as reformate gas is injected into the CO trap (since non-CO components may substantially diffuse through the sieve material but CO may substantially not diffuse through the sieve material). Thus, in some examples, injection of reformate gas into the CO trap may be temporarily stopped so that CO may be purged from the CO trap and delivered to the engine and/or exhaust. For example, injection of reformate gas into the CO trap may be temporarily stopped when a pressure of the gas in the CO trap reaches a predetermined threshold value. In some examples, a valve may be disposed in line 69 or in CO trap to control flow of reformate entering CO trap. In other examples, the reformer may be temporarily deactivate during these CO trap purge cycles. The pressure of the gases in the CO trap may be sufficient to drive delivery of CO to the engine or exhaust, e.g., via valve 43.

If pressure swing adsorption is employed in the CO trap, then a plurality of adsorbent vessels may be included in the CO trap and pressure cycles may be employed to continuously store and purge CO in the adsorbent vessels. For example, once a first adsorbent vessel becomes saturated with CO, reformate is diverted to a second adsorbent vessel in the CO trap while the first adsorbent vessel is purged of CO. In this way, near continuous output of CO by the CO trap may be achieved.

At 208, method 200 includes delivering separated CO to the engine. For example, valve 43 may direct CO output by the CO trap 31 to the intake manifold 44 via fuel line 33 and injector 35. The CO output by the CO trap may be continuously fed into the engine at the rate at which it leaves the CO trap.

At 210, method 200 includes adjusting engine operating parameters based on the amount of CO delivered to the engine. In some examples, the amount of CO delivered to the engine may be monitored via a sensor, e.g., a pressure or flow rate sensor, disposed in the CO trap or CO fuel line, e.g., fuel line 33. Engine operating parameters adjusted in response to injecting an amount of CO into the engine may include: spark timing, cylinder air charge, amount of non-CO fuel injected in the engine, etc.

For example, an increase in the amount of CO injected into the engine may result in an increase in at least one of spark timing and air charge. For example, actuators such as the throttle, valve timing (e.g., camshaft position), valve lift, and boost pressure may be set to positions that increase cylinder air charge when the amount of CO injected to the engine increases. Thus, the engine may be run lean when CO is injected in the engine.

An increase in the amount of CO injected into the engine may also result in a decrease in an amount of non-CO fuel injected to the engine, e.g., from fuel tank 91 or reformate storage tank 93. For example, if reformate is used to fuel the engine, e.g., during cold starts or high load conditions, and CO is output by the CO trap, the amount of non-CO reformate delivered to the engine may be decreased. Likewise, if fuel from the fuel tank, e.g., tank 91, is used to fuel the engine, and CO is output by the CO trap, then the amount of non-CO fuel delivered to the engine may be decreased.

Figure 3:
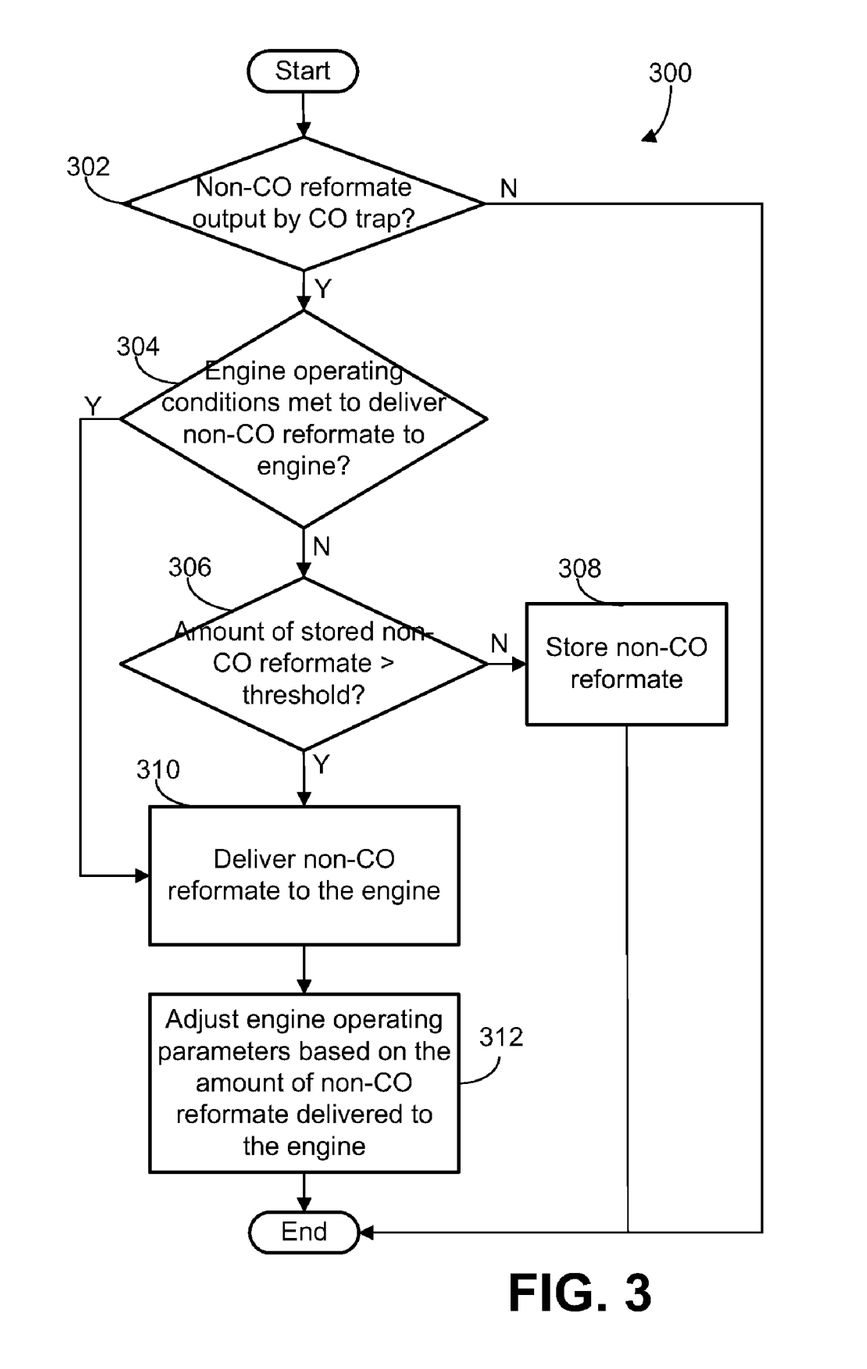
FIG. 3 shows an example method for storing non-CO reformate output and delivering non-CO reformer output to the engine.

At 212, method 200 includes storing non-CO reformate output and/or delivering non-CO reformate output to the engine. After the CO trap strips the CO from the reformate gas output by the reformer, the resulting non-CO reformate may be delivered to the engine, e.g., to assist in cold starts or suppress engine knock during high load conditions or stored for subsequent use by the engine. FIG. 3 shows an example method 300 for delivering non-CO reformate output to the engine and storing non-CO reformate, e.g., in reformate storage tank 93.

At 302 method 300 includes determining if non-CO reformate is output by the CO trap. Non-CO reformate may be output by the CO trap when the fuel reformer is in operation and the CO trap adsorbed the CO in the reformate output by the reformer, as described above. If non-CO reformate is output by the CO trap at 302, method 300 proceeds to 304. In some examples, one or more sensors, e.g., a flow rate sensor, may be disposed in the CO trap to determine an amount, e.g., a flow rate, of non-CO reformate output by the CO trap.

At 304, method 300 includes determining whether engine operating conditions are met to deliver non-CO reformate to the engine. In contrast to the continuous delivery of separated CO to the engine, non-CO reformate delivery to the engine may depend on a variety of engine operating parameters. For example, non-CO reformate delivery to the engine may occur during cold start conditions, when the temperature of the engine is below a threshold temperature, or during high load conditions, e.g., engine RPM above a threshold value, to reduce engine knock.

If engine operating conditions to deliver non-CO reformate to the engine are not met at 304, method 300 proceeds to 306. At 306, method 300 includes determining if the amount of stored non-CO reformate is greater than a threshold value. In some examples, non-CO reformate components may be stored in a quantity less than a threshold value, e.g., less than 0.1 gasoline gallon equivalent (GGE), in order to decrease an amount of gas leakage and increase safety in storing the gases. The amount of non-CO reformate stored may be determined by a variety of sensors disposed in a reformate storage tank. For example, a pressure and/or temperature sensor disposed in a reformate storage tank may be used to determine an amount of stored non-CO reformate.

If the amount of stored non-CO reformate is less than a threshold value at 306, method 300 proceeds to 308. At 308, non-CO reformate output by the CO trap is stored, e.g., in reformate storage tank 93.

However, in some examples, if the amount of stored non-CO reformate is greater than a threshold value at 306, then method 300 proceeds to 310 to deliver the non-CO reformate to the engine. In this case, the reformate storage tank may be filled to the threshold value, thus to prevent leakage conditions, the non-CO reformate may be injected to the engine at 310.

Following injection of non-CO reformate delivery to the engine at 310, method 300 proceeds to 312. At 312, method 300 includes adjusting engine operating parameters based on the amount of non-CO reformate delivered to the engine. In some examples, the amount of CO delivered to the engine may be monitored via a sensor, e.g., a pressure or flow rate sensor, disposed in the CO trap or CO fuel line, e.g., fuel line 33. Engine operating parameters adjusted in response to injecting an amount of CO into the engine may include, spark timing, cylinder air charge, non-CO fuel injection amount, etc.

For example, an increase in the amount of CO injected into the engine may result in an increase in at least one or spark timing and air charge. For example, actuators such as the throttle, valve timing (e.g., camshaft position), valve lift, and boost pressure may be set to positions that increase cylinder air charge when the amount of reformate injected to the engine increases.

However, if at 304 engine operating conditions to deliver non-CO reformate to the engine are met, method 300 proceeds to 310. At 310, method 300 includes delivering non-CO reformate to the engine. In this case, non-CO reformate may be delivered to the engine to assist in cold starts or to suppress knock, e.g., during high load conditions.

Following injection of non-CO reformate delivery to the engine at 310, method 300 proceeds to 312. At 312, method 300 includes adjusting engine operating parameters based on the amount of non-CO reformate delivered to the engine as described above.

Thus non-CO reformate storage or delivery to the engine may be based on a variety of engine operating parameters in contrast to the delivery of CO to the engine which is continuously delivered to the engine at the rate it is output by the CO trap. Since, CO is removed from the reformate before storage, reformate components produced by the fuel reformer, e.g., $H_2$ and $CH_4$, may be safely stored for use by the engine.

Continuing with method 200 in FIG. 2, following non-CO storage and/or delivery to the engine, method 200 proceeds to 214. At 214, method 200 includes determining if the reformer is deactivated. For example, engine operating conditions may be such that the reformer reaction is stopped, e.g., if the temperature of the reformer is too low, if there is insufficient alcohol in the fuel supplied to the reformer, or if one or more components of the reformer system become degraded. As another example, the reformer may be deactivated during an engine shutdown.

If the reformer is not deactivated at 214, method 200 returns to step 206 to continue separating CO from the reformer output and combust it in the engine and/or exhaust until the reformer is deactivated to stop producing reformate.

If the reformer is deactivated at 214, method 200 proceeds to 218. At 218, method 200 includes determining if the engine is running following a deactivation of the fuel reformer. For example, engine operating conditions may be such that the reformer reaction is stopped, e.g., if the temperature of the reformer is too low, if there is insufficient alcohol in the fuel supplied to the reformer, or if one or more components of the reformer system become degraded. As another example, the reformer may be deactivated during an engine shutdown.

When the fuel reformer is deactivated, an amount of CO may remain in the CO trap following the deactivation. For example, CO may remain in the adsorbent material in the CO trap following deactivation of the reformer when reformate is no longer being produced. In some examples, the CO in the CO trap may be purged following deactivation of the reformer.

If the engine is still running following deactivation of the reformer, then method 200 proceeds to 220. At 220, method 200 includes purging the separated CO from the CO trap and delivering the purged CO to the engine.

Purging the CO from the CO trap may include adjusting one or more operating parameters of the CO trap. For example, a pressure of one or more adsorbent vessels in the CO trap may be reduced to purge the CO from the CO trap. Pressure may be decreased in one or more adsorbent vessels in the CO trap by adjusting one or more valves in the CO trap. For example, valve 43 may be opened while valve 47 is closed so that CO is purged from the CO trap and delivered to the engine. In some examples, purging the CO from the CO trap may include flushing the CO from the CO trap using a gas. For example, exhaust gas or air may be directed to flow through the adsorbent materials in the CO trap in order to purge the CO from the CO trap.

As another example, a temperature of one or more adsorbent vessels in the CO trap may be increased to purge the CO from the CO trap. In some examples, temperature of one or more adsorbent vessels in the CO trap may be increased by a heater located within the CO trap. In other examples, exhaust gas may be directed to flow through the CO trap in order to increase the temperature to purge the CO from the CO trap.

At 222, method 200 includes adjusting engine operating parameters in response to the amount of CO purged. In some examples, the amount of CO delivered to the engine may be monitored via a sensor, e.g., a pressure or flow rate sensor, disposed in the CO trap or CO fuel line, e.g., fuel line 33. Engine operating parameters adjusted in response to injecting an amount of CO into the engine may include, spark timing, cylinder air charge, non-CO fuel injection amount, etc.

For example, an increase in the amount of CO injected into the engine may result in an increase in at least one or spark timing and air charge. For example, actuators such as the throttle, valve timing (e.g., camshaft position), valve lift, and boost pressure may be set to positions that increase cylinder air charge when the amount of reformate injected to the engine increases.

An increase in the amount of CO injected into the engine may also result in a decrease in an amount of non-CO fuel injected to the engine, e.g., from fuel tank 91 or reformate storage tank 93. For example, if reformate is used to fuel the engine, e.g., during cold starts or high load conditions, and CO is output by the CO trap, the amount of non-CO reformate delivered to the engine may be decreased. Likewise, if fuel from the fuel tank, e.g., tank 91, is used to fuel the engine, and CO is output by the CO trap, then the amount of non-CO fuel delivered to the engine may be decreased.

Adjusting engine operating parameters in response to the amount of CO purged may also include adjusting engine operating parameters in response to how the CO trap is purged. For example, if exhaust gas is used to increase the temperature of one or more adsorbent vessels in the CO trap, then the engine operating parameters may be adjusted to increase exhaust gas temperature. For example, the engine may operate at higher RPM. As another example, if exhaust gas is used to flush the CO from the CO trap during the purge, then engine operating parameters may be adjusted to increase exhaust flow rate, e.g. engine RPM may be temporarily increased to assist in the purging.

However, if the reformer is deactivated at 216 or 214 and the engine is not running at 218, then method 200 proceeds to 224. In this case the reformer is deactivated when the engine is shutdown. As described above, following reformer deactivation, CO may remain in the adsorbent material of the CO trap.

Thus, at 224, method 200 includes purging the separated CO from the CO trap and delivering the CO to the exhaust.

Purging the CO from the CO trap at an engine shutdown may include adjusting a variety of engine and/or exhaust operating conditions. For example, purging the CO from the CO trap at an engine shutdown may include depressurizing the adsorbent vessels in the CO trap to release the CO in the adsorbent material. Depressurization of the adsorbent vessels in the CO trap may include adjusting one or more valves in the CO trap as described above. For example, valve 47 may be closed and valve 43 opened to direct the purged CO to the engine exhaust Immediately following an engine shutdown, the exhaust may remain sufficiently heated to combust the purged CO from the CO trap, or to react in an exhaust catalyst, e.g., catalyst 70.

Figure 4:
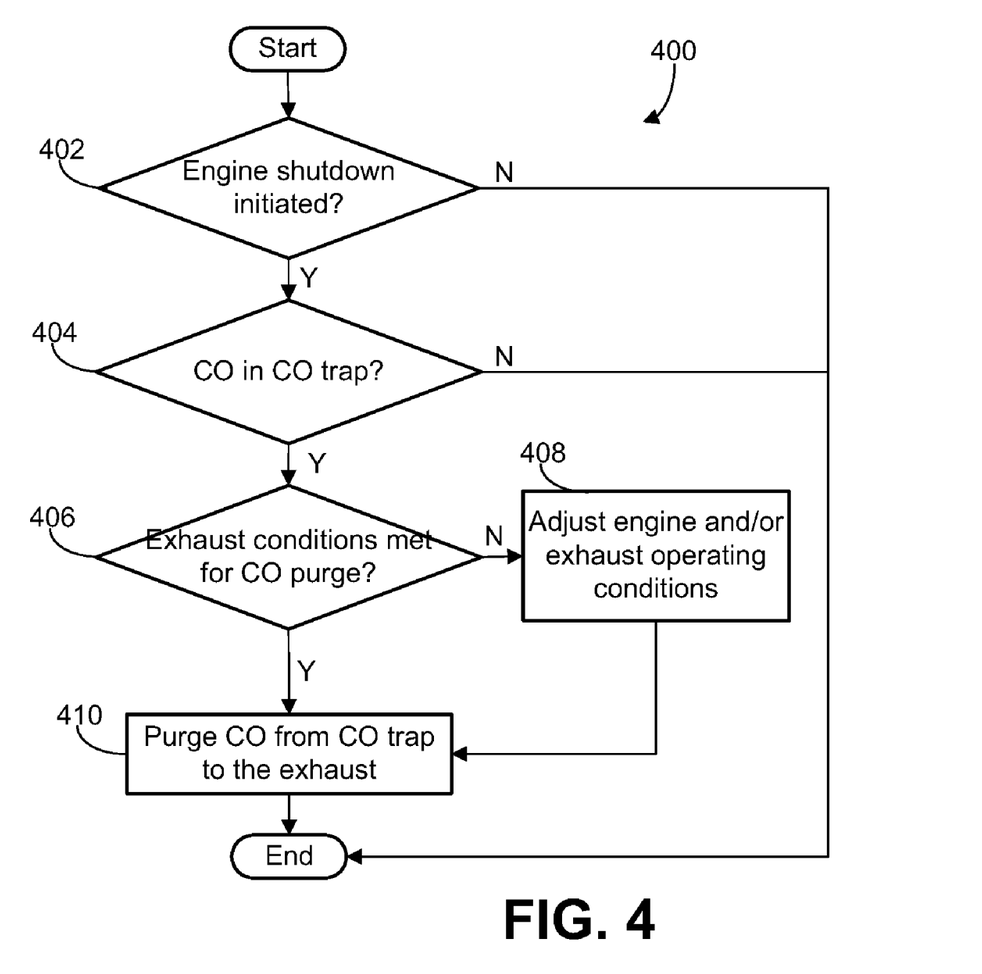
FIG. 4 shows an example method for purging CO from a CO trap at an engine shutdown.

An example method 400 for purging CO from the CO trap during an engine shutdown is shown in FIG. 4.

At 402, method 400 includes determining if an engine shutdown is initiated. For example, an engine operator may initiate an engine shutdown. Initiation of an engine shutdown may be sent to an engine controller, e.g., controller 12, in some examples. If an engine shutdown is initiated at 402, method 400 proceeds to 404.

At 404, method 400 includes determining if CO is in the CO trap. CO may remain in the CO trap following a deactivation of the fuel reformer, as described above. In some examples, one or more sensors may be disposed in the CO trap to determine an amount of CO in the CO trap. In other examples, an amount of CO in the CO trap may be based on operating conditions of the reformer. For example, an amount of CO in the CO trap may be based on how long the fuel reformer was running before it was deactivated. Additionally, an amount of CO in the CO trap may be based on a size or type of catalyst and/or the number of catalysts in the CO trap. If CO is determined to be in the CO trap at 404, then method 400 proceeds to 406.

At 406, method 400 includes determining if exhaust conditions for a CO purge are met. In some examples, a temperature of the exhaust system may be measured, e.g. via a temperature sensor, and compared with a threshold temperature. The threshold temperature may be a temperature above which Co injected into the exhaust will be sufficiently combusted to $CO_2$. In other examples, an oxygen content of the exhaust and/or emissions control catalyst, e.g., catalyst 70, may be measured and compared with an oxygen content threshold value. The oxygen content threshold value may be an amount of oxygen above which an amount of CO injected into the exhaust will become substantially oxidized to CO2. The oxygen content threshold value may depend on the amount of CO injected into the exhaust.

If exhaust conditions for a CO purge are not met at 406, then method proceeds to 408. At 408, method 400 includes adjusting engine and/or exhaust operating conditions so that exhaust conditions for a CO purge are met.

For example, if the exhaust and/or emission control catalyst, e.g., catalyst 70, does not have sufficient stored oxygen in order to oxidize the amount of CO in the CO trap after an engine shutdown is initiated, the engine may be run lean for a plurality of combustion cycles before discontinuing combustion in the engine. As another example, the engine throttle and/or valve timing may be adjusted following an initiated engine shutdown to increase fresh air pumped through the engine as the engine spins down to rest. In this way, when CO is purged from the CO trap, more CO may be oxidized in the exhaust resulting in reduced CO emissions.

In other examples, if the temperature of the exhaust is below a threshold temperature at which CO injected into the exhaust will be sufficiently combusted, purging CO from the CO trap may be delayed for a duration until the exhaust reaches a threshold temperature. In this way, when CO is purged from the CO trap, more CO may be combusted in the exhaust resulting in reduced CO emissions.

Once the exhaust conditions for a CO purge are met at 406 or engine and/or exhaust operating conditions are adjusted at 408, then method 400 proceeds to 410.

At 410, method 400 includes purging the separated CO from the CO trap and delivering the CO to the exhaust. For example, purging the CO from the CO trap at an engine shutdown may include depressurizing the molecular sieves or adsorbent vessels in the CO trap to release the CO in the adsorbent material. Depressurization of the molecular sieves or adsorbent vessels in the CO trap may include adjusting one or more valves in the CO trap. For example, valve 47 may be closed and valve 43 opened to direct the purged CO to the engine exhaust.

Additionally, a rate of purging may be adjusted based on various exhaust conditions. For example, as a temperature of the exhaust increases, the rate of CO purged from CO trap may increase, e.g., via adjusting valve 43. As another example, as an oxygen content of the exhaust increases, the rate of CO purged from CO trap may increase, e.g., via adjusting valve 43.

In this way CO may be purged from the CO trap and substantially oxidized to reduce CO emissions and reduce storage of CO onboard the engine.

In some examples, a portion of CO in the CO trap may be used to keep the reformer catalyst warm during and following an engine shutdown event. For example, a purge rate of the CO in the CO trap may be reduced in response to an engine shutdown event in order to keep the reformer catalyst warm for a duration following the engine shutdown event. In this way, the reformer catalyst may be heated for a subsequent operation.

Note that the example systems and methods included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
reforming a fuel into a gaseous fuel comprising $H_2$, CO, and $CH_4$;
selectively storing at least one of $H_2$ and $CH_4$ to a greater extent than CO; and
separating the CO from the gaseous fuel and injecting the separated CO in a cylinder of the engine after it is separated from the gaseous fuel without storing the CO.

2. The method of claim 1, further comprising adjusting one or more engine operating conditions based on an amount of CO injected into the engine.

3. The method of claim 2, wherein adjusting one or more engine operating conditions based on an amount of CO injected into the engine includes increasing at least one of spark timing and cylinder air charge in response to an increase in the amount of CO injected into the engine.

4. The method of claim 1, wherein the CO is separated from the gaseous fuel by a molecular sieve.

5. The method of claim 1, wherein the CO is separated from the gaseous fuel by pressure swing adsorption.

6. The method of claim 1, wherein selectively storing at least one of $H_2$ and $CH_4$ includes operating said engine by injecting at least one of $H_2$ and $CH_4$ to the cylinder of the engine in response to an available amount of at least one of $H_2$ and $CH_4$, engine speed, and engine load, and storing an amount of at least one of $H_2$ and $CH_4$ not used by the engine.

7. The method of claim 6, further comprising separating an amount of CO from the gaseous fuel and injecting the amount of CO in the cylinder of the engine continuously after it is separated and adjusting engine operating parameters based on the amount of CO injected in the cylinder, and delivering at least one of $H_2$ and $CH_4$ to the engine based on engine operating conditions and the amount of $H_2$ and $CH_4$ stored.

8. The method of claim 1 wherein selectively storing at least one of $H_2$ and $CH_4$ includes in a first condition where an amount of stored $H_2$ and $CH_4$ is less than a threshold storing at least one of $H_2$ and $CH_4$, and in a second condition where an amount of stored $H_2$ and $CH_4$ is greater than a threshold not storing $H_2$ or $CH_4$ and delivering at least one of $H_2$ and $CH_4$ to the engine.

9. A method for operating an engine with a fuel reformer, comprising:
operating the reformer to reform a fuel into a gaseous fuel comprising $H_2$, CO, and $CH_4$;
separating the CO from the gaseous fuel;
injecting the separated CO in a cylinder of the engine after it is separated from the gaseous fuel; and adjusting one or more engine operating conditions based on an amount of CO injected into the engine including increasing at least one of spark timing and cylinder air charge in response to an increase in the amount of CO injected into the engine.

10. The method of claim 9, wherein the CO is separated from the gaseous fuel by a molecular sieve.

11. The method of claim 9, wherein the CO is separated from the gaseous fuel by pressure swing adsorption.

12. The method of claim 9, further comprising injecting the separated CO into an exhaust of the engine when the fuel reformer is deactivated.

13. The method of claim 12 further comprising running the engine lean in response to injecting separated CO in the engine, and
delivering the remaining gaseous fuel to the engine, where the amount delivered is adjusted in response to engine knock.

14. The method of claim 9, further comprising using at least a portion of CO in a CO trap to keep a catalyst in the fuel reformer warm for a duration following an engine shutdown.

15. A system comprising:
an engine, including a cylinder for combustion of fuel and an exhaust system;
a reformer, configured to reform a fuel into a gaseous fuel comprising $H_2$, CO, and $CH_4$
a CO trap, for separating the CO from the gaseous fuel;
a storage tank configured to store at least one of $H_2$ and $CH_4$;
a computer readable storage medium having instructions encoded thereon, including:
instructions to inject the separated CO in the cylinder of the engine or the exhaust system continuously after it is separated from the gaseous fuel; and
instructions to selectively store at least one of $H_2$ and $CH_4$.

16. The system of claim 15 wherein the CO trap includes a molecular sieve.

17. The system of claim 15 wherein selectively storing at least one of $H_2$ and $CH_4$ includes operating said engine by injecting the gaseous fuel to the cylinder of the engine in response to an available amount of said gaseous fuel, engine speed, and engine load, and storing an amount of at least one of $H_2$ and $CH_4$ not used by the engine, the system further comprising a CNG compressor, where the CNG compressor is used to store at least one of $H_2$ and $CH_4$.

* * * * *